(12) United States Patent
Sanada et al.

(10) Patent No.: US 6,538,984 B2
(45) Date of Patent: Mar. 25, 2003

(54) DISK CARTRIDGE AND DISK CARTRIDGE LOADING METHOD

(75) Inventors: Yotaro Sanada, Tokyo (JP); Yoshio Kusui, Kanagawa (JP); Naohiro Netsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/775,200

(22) Filed: Feb. 1, 2001

(65) Prior Publication Data

US 2002/0067691 A1 Jun. 6, 2002

(30) Foreign Application Priority Data

Feb. 4, 2000 (JP) .......................... 2000-028074

(51) Int. Cl.[7] .............. G11B 3/70; G11B 5/84; G11B 7/26; G11B 23/03
(52) U.S. Cl. ........................ 369/291; 360/133
(58) Field of Search ................. 369/291, 272; 360/133, 132, 131

(56) References Cited

U.S. PATENT DOCUMENTS

| 5,046,170 A | * | 9/1991 | Oshima et al. | 360/133 |
|---|---|---|---|---|
| 5,293,294 A | * | 3/1994 | Chappell | 360/133 |
| 5,530,691 A | | 6/1996 | Fujisawa | 369/291 |
| 5,748,420 A | * | 5/1998 | Ko et al. | 360/133 |
| 5,764,623 A | | 6/1998 | Akiyama et al. | 369/291 |
| 5,799,009 A | | 8/1998 | Takahashi et al. | 369/291 |
| 5,898,659 A | | 4/1999 | Goto | 369/77.2 |
| 5,901,134 A | | 5/1999 | Funawatari | 369/291 |

FOREIGN PATENT DOCUMENTS

| EP | 0871176 | 10/1998 |
|---|---|---|
| EP | 0918329 | 5/1999 |
| WO | 9941745 | 8/1999 |

\* cited by examiner

*Primary Examiner*—Brian E. Miller
*Assistant Examiner*—Julie Anne Watko
(74) *Attorney, Agent, or Firm*—Jay H. Maioli

(57) ABSTRACT

A disk cartridge and its loading method in which loading recessed portions can easily be secured and mis-loading and mis-insertion of the disk cartridge can be prevented, wherein the disk cartridge has at its left and right side end portions on the insertion side formed as a pair of loading recess portions and one loading recess portion is hidden by a shutter plate that has been placed in the closed state.

3 Claims, 3 Drawing Sheets

DISK CARTRIDGE AND DISK CARTRIDGE LOADING METHOD

BACKGROUND OF THE INVENTION

1. Field of the Invention

The present invention relates to a disk cartridge in which an information signal is recorded on a signal recording layer or a recorded information signal is reproduced from the signal recording layer with irradiation of light beams on the signal recording layer of an optical disk and a disk cartridge loading method, for example. More specifically, the present invention relates to a disk cartridge and a disk cartridge loading method in which one of loading recess portions formed on left and right side end portions of a disk housing in the insertion side of a disk cartridge is hidden by a shutter placed in a closed state. When the disk cartridge is inserted into a drive apparatus, the shutter is opened by a shutter releasing member of the drive apparatus, and immediately after one loading recess portion hidden by the shutter is exposed, the pair of loading recess portions are chucked by a loading arm and thereby the disk cartridge is brought to a loading position.

2. Description of the Related Art

As a recording medium for recording thereon a variety of information such as audio information or video information, there have heretofore been proposed optical disks capable of reproducing recorded information from this recording medium or recording information on this recording medium by using light beams. This kind of optical disk can be formed of a single disk and hence it can be easy to handle. Simultaneously, since this type of optical disk has a large recording capacity as compared with a recording medium such as a magnetic tape, it has been widely used as a recording medium for recording thereon audio information, video information and data that should be processed by computers.

Since it is expected that this type of disk can be miniaturized much more as a so-called disk cartridge obtained when it is housed within a cartridge housing, it can be expected that such a disk can be used in portable devices such as a video camera device. In addition, since video camera devices are increasingly miniaturized in recent years, a demand for miniaturizing video camera devices increases unavoidably even when a disk cartridge is used.

In a disk cartridge such as an MD (mini disc) which is an optical disk, for example, the disk cartridge has at its left and right side end portions a pair of loading recess portions for forcing the disk cartridge to be loaded on and unloaded from a drive apparatus.

While it is advantageous from a functional standpoint that the above loading recess portions should be formed at the left and right side end portions near the insertion side of the disk cartridge, if the disk cartridge is shaped such that two corner portions of the insertion side of the disk cartridge are largely diagonally cut off as the disk cartridge is being miniaturized, then this imposes restrictions on maintaining the above loading recess portions.

In the above disk cartridge such as the MD, when the disk cartridge is inserted into the drive apparatus, a shutter of the disk cartridge is released from being locked by a shutter lock releasing member in synchronization with the operation in which the disk cartridge is held by a loading arm disposed on the drive apparatus and brought to a loading position. There have conventionally been cases of a mis-loading or mis-insertion such that the disk cartridge is brought to the loading position even under the state in which the shutter is not released from being locked and remains still closed.

The present invention is made in order to solve the above problems and intended to obtain a disk cartridge and a disk cartridge loading method in which when a disk cartridge is miniaturized, loading recess portions can be secured with ease and a mis-loading or mis-insertion of a disk cartridge can be prevented.

SUMMARY OF THE INVENTION

In order to attain the above objects, in a disk cartridge according to the present invention, a disk housing has a pair of loading recess portions formed at its left and right side end portions in the insertion side of the disk cartridge and any one of the loading recess portions is hidden by a shutter which has been placed in a closed state.

In a disk cartridge loading method according to the present invention, when the disk cartridge is inserted into the drive apparatus, the shutter is pressed and opened by a shutter lock releasing member of the drive apparatus so that, immediately after one loading recess portion that had been hidden by the shutter is exposed, the pair of loading recess portions are held by a loading arm and thereby the disk cartridge is brought to the loading position.

According to the above disk cartridge and its loading method, when the disk cartridge is inserted into the drive apparatus and the shutter is released by the shutter lock releasing member, one loading recess portion is exposed, whereby the pair of loading recess portions are chucked by a loading arm and thereby the disk cartridge is brought to the loading position. Accordingly, even when the shutter is not opened after the disk cartridge has been inserted into the drive apparatus, the loading arm becomes unable to hold the loading recess portions so that the disk cartridge cannot be brought to the loading position.

DESCRIPTION OF THE PREFERRED EMBODIMENTS

A disk cartridge and a disk cartridge loading method according to an embodiment of the present invention will hereinafter be described with reference to the drawings.

Figure 1:
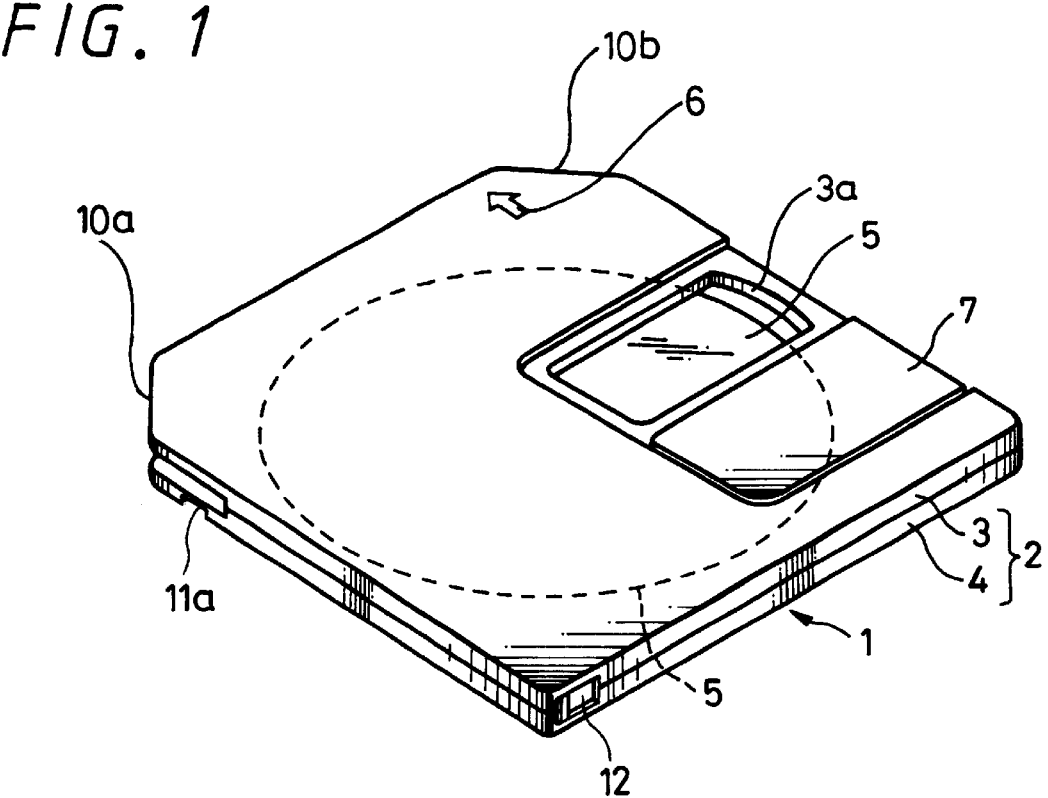
FIG. 1 is a perspective view illustrating a disk cartridge according to the present invention from the side of an upper half.
Figure 2:
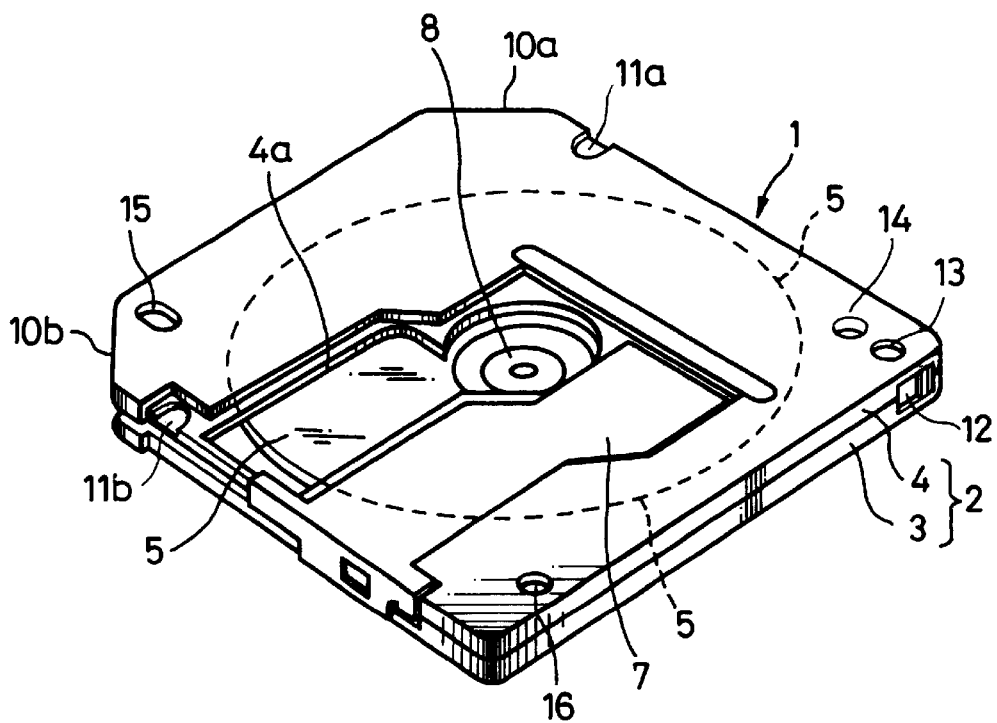
FIG. 2 is a perspective view illustrating the same disk cartridge according to the present invention from the side of a lower half.

FIG. 1 is a perspective view illustrating from the side of an upper half a disk cartridge with its shutter being opened. FIG. 2 is a perspective view illustrating from the side of a lower half the same disk cartridge with its shutter being opened.

A disk cartridge is generally depicted by reference numeral 1, and a cartridge housing 2 is comprised of an upper half 3 and a lower half 4 which are fastened at their joint surfaces by ultrasonic welding. A disk 5 stored within the disk cartridge 1 is an optical disk, for example, and the direction in which the disk cartridge 1 is inserted into the drive apparatus is shown by an arrow-like marker 6.

The above disk cartridge 1 includes a shutter plate 7 which can be slid to open and close both surfaces of the cartridge housing 2. When this shutter plate 7 is opened on the upper surface side of the disk cartridge 1, the disk 5 is partly exposed at its upper surface along the diametrical direction from an opening window 2a defined on the upper half 2. When the shutter plate is opened on the lower surface side of the disk cartridge 1, the disk 5 is partly exposed at its lower surface (read/write surface) along the diametrical direction from an opening window 3a defined on the lower half 3. When the shutter plate 7 is released to open, a chucking plate 8 of the disk 5 is exposed on the lower surface side of the disk cartridge 1.

While this shutter plate 7 is being placed in the closed state, it is locked to the closed position by a lock member, not shown. When the shutter plate 7 is opened, the disk cartridge 1 is inserted into the drive apparatus so that a shutter lock releasing member 9 (see FIG. 3) releases the lock member to allow the shutter plate 7 to be opened.

On the front end side of the insertion direction of the disk cartridge, two corner portions of the disk cartridge 1 are diagonally cut off to form relatively-large recessed surfaces 10, 10. These recessed surfaces 10, 10 are identified as the insertion side of the disk cartridge 1 and can be useful for miniaturizing the disk cartridge 1.

On the front end side of the insertion direction of the disk cartridge 1, the lower half 4 has at its side end portion one loading portion 11a adjacent to one recessed surface 10a. While the shutter plate 7, which is located at the closed position, is covering the side end portion of the lower half 4 adjacent to the other recessed surface 10b, the other loading recess portion 11b is formed on the side end portion of the lower half 4 under the shutter plate 7 at the position parallel to the above loading recess portion 11a. This loading recess portion 11b is hidden by the shutter plate 7 when the shutter plate 7 is closed.

The disk cartridge 1 has on its back formed a mis-erase preventing plug 12 to prevent recorded information from being erased from the disk 5 by mistake. The lower half 4 has formed thereon a mis-erase prevention detecting hole 13 which is opened and closed in synchronization with a slide operation of this mis-erase preventing plug 12. Reference numeral 14 denotes an identifying hole which is useful for identifying a specification of the disk cartridge 1.

The lower half 3 of the disk cartridge 1 has an oblong location hole 15 defined at its one side on the front end side of the insertion direction and also has a circular location hole 16 defined in the rear end of the insertion direction at the opposite side of the location hole 15.

Figure 3:
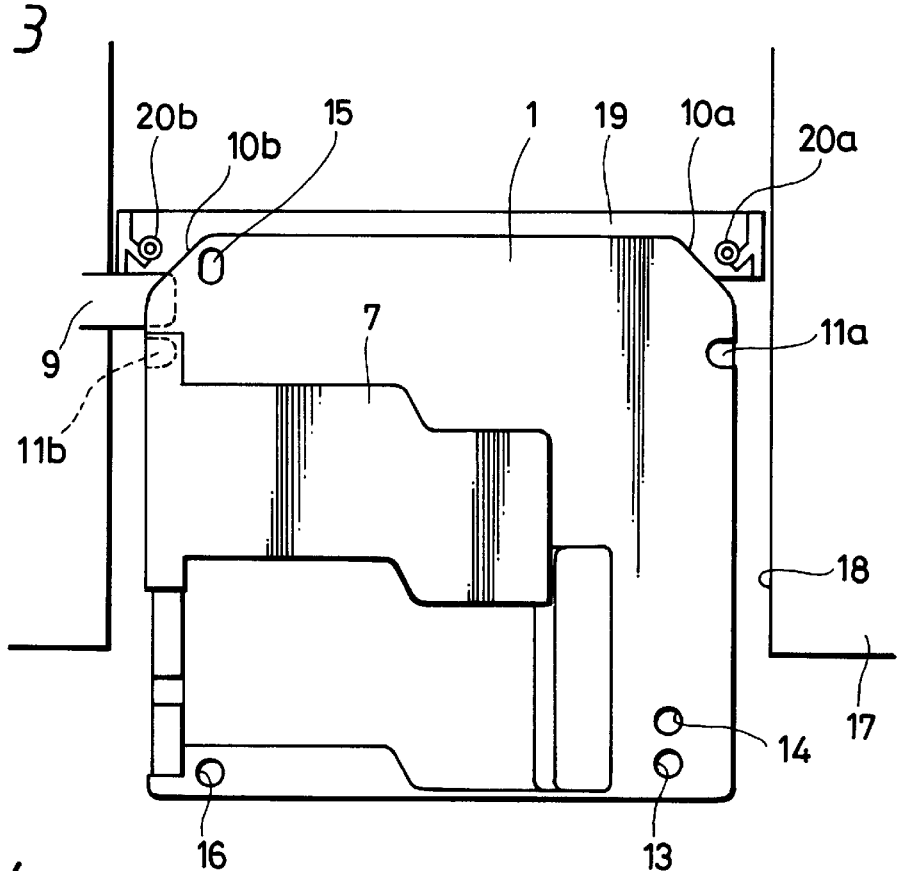
FIG. 3 is a plan view illustrating from the side of the lower half the state in which a disk cartridge is inserted into a drive apparatus.

FIG. 3 is a plan view illustrating from the lower half side the state in which the disk cartridge 1 is inserted into the drive apparatus.

A drive apparatus 17 such as a recording and reproducing apparatus has the above shutter lock releasing member 9 disposed in an opposing relation to an insertion slot 18 of the disk cartridge 1. The drive apparatus has at the rear of the shutter lock releasing member 9 disposed a loading arm to bring the disk cartridge 1 to a loading position or to eject the disk cartridge to an unloading position. The loading arm 19 includes a pair of right and left chucking rollers 20a, 20b.

A loading operation and an unloading operation of the disk cartridge 1 will be described with reference to FIGS. 4 and 5 together with FIG. 3.

[Loading Operation of Disk Cartridge]

FIG. 3 shows the state in which a user has inserted the disk cartridge 1 into the insertion slot 18 of the drive apparatus 17. At that very moment, in the disk cartridge 1, the lock member, not shown, of the shutter plate 7 is released by the shutter lock releasing member 9.

When a user pushes the disk cartridge 1 into the drive apparatus 17 side with pressure, the shutter plate 7 butts against the shutter lock releasing member 9 and thereby withdraws. Then, while the shutter plate 7 is being released to open, the chucking rollers 20a, 20b of the loading arm 19 are moved along the right and left side surface portions from the recessed surfaces 10a, 10b of the disk cartridge 1. Thereafter, as shown in FIG. 4, as one chucking roller 20a is chucked by one loading recess portion 11a, the other chucking roller 20b is concurrently chucked by the other loading recess portion 11b which was exposed from the shutter plate 7.

Figure 5:
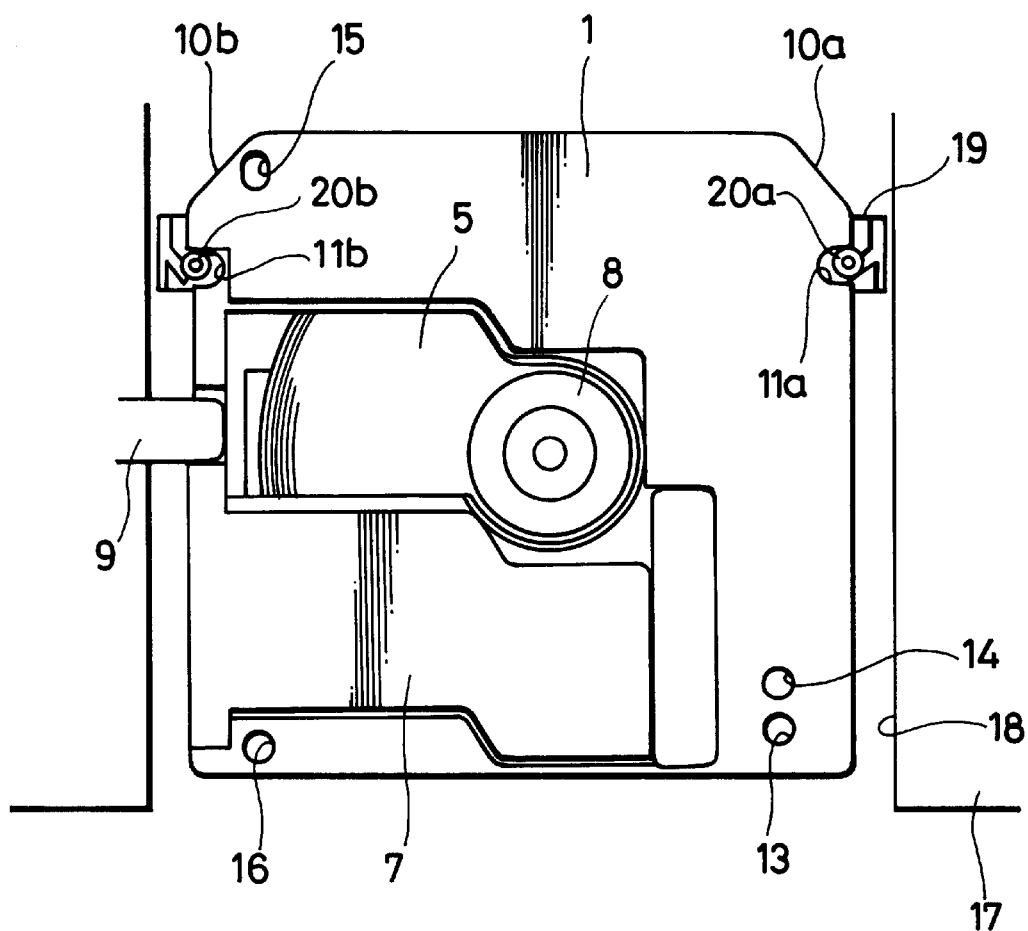
FIG. 5 is a plan view to which reference will be made in explaining operation in which the same disk cartridge is moved to the loading position.

As a result, the loading arm 19 in which the loading recess portions 11a, 11b of the disk cartridge 1 have been chucked by its chucking rollers is moved forward in the loading direction, whereby the disk cartridge 1 is brought to the loading position, the shutter plate 7 is completely opened at the loading position by the shutter lock releasing member 9 as shown in FIG. 5 and thereby the drive apparatus is placed in the recording/reproducing operation mode of the disk cartridge 1.

[Unloading Operation of Disk Cartridge]

Figure 4:
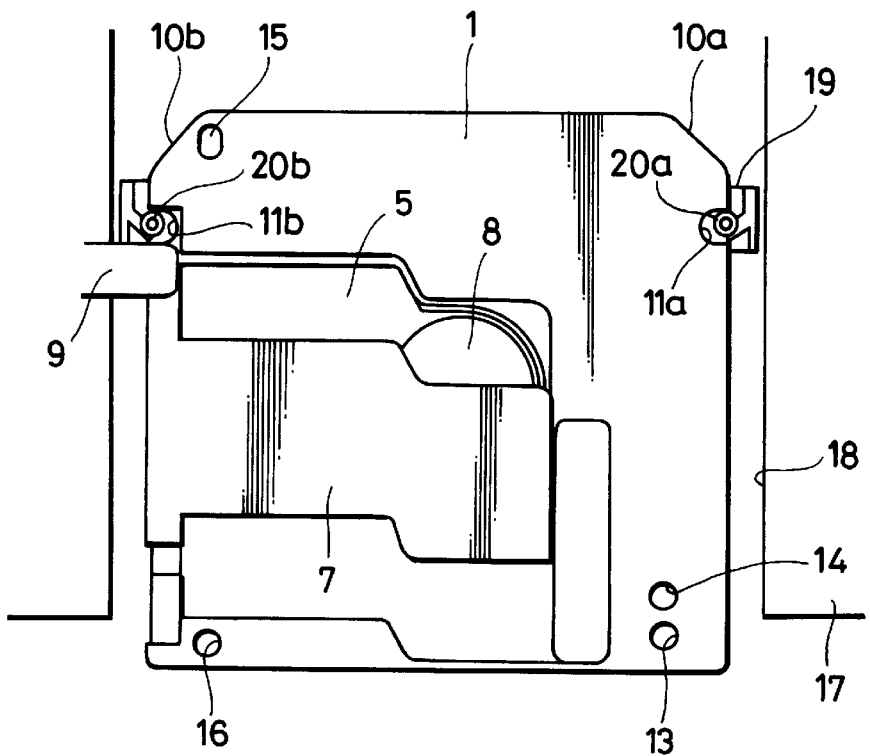
FIG. 4 is a plan view to which reference will be made in explaining operation in which the same disk cartridge is chucked by a loading arm.

The disk cartridge 1 whose recording/reproducing operation had been brought to an end is moved to the eject position shown in FIG. 4 as the loading arm 19 is moved backward from the loading position shown in FIG. 5. Then, when a user pinches the tip portion of and pulls out the disk cartridge protruded from the insertion slot 18 of the drive apparatus 17, the loading recess portions 11a, 11b are disengaged from the chucking rollers 20a, 20b of the loading arm 19. At the same time, while the shutter plate 7 is being closed and the loading recess portion is being hidden by the shutter plate, a user can eject the disk cartridge 1 from the drive apparatus.

When a user ejects the disk cartridge from the drive apparatus, the shutter plate 7 may be closed by a spring member provided in the disk cartridge, for example. Alternatively, as the disk cartridge 1 is moved in the eject direction, the shutter plate 7 may be engaged with a suitable means such as a pin member provided in the drive apparatus 17 side and thereby the shutter may be closed.

As described above, according to the present invention, when the disk cartridge 1 is inserted into the drive apparatus 17 so that the shutter plate 7 is released to open by the shutter lock releasing member 9, the loading recess portion 11b is exposed and the pair of loading recess portions 11a, 11b are chucked by the loading arm 19 and thereby the disk cartridge is brought to the loading position. Therefore, even when the shutter is not opened after the disk cartridge has been inserted into the drive apparatus, the loading recess portions cannot be chucked by the loading arm and thereby the disk cartridge can be avoided from being brought to the loading position. Thus, the so-called mis-loading or mis-insertion of the disk cartridge 1 can be prevented.

Since the loading recess portions 11a, 11b can be disposed in the positions overlapping the shutter plate 7 which is withdrawn from the insertion side of the disk cartridge 1, the two corner portions which are vacant spaces on the insertion side of the disk cartridge 1 can increase. Therefore, the disk cartridge 1 itself can be miniaturized more. With this miniaturization of the disk cartridge, product devices such as video camera devices using the disk cartridge 1 also can be miniaturized.

The present invention is not limited to the above embodiment also illustrated in the sheets of drawings and may be variously modified without departing from the gist of the present invention.

According to the embodiment, although an explanation has been given of the case where the both corner portions on the insertion side of the disk cartridge 1 are diagonally cut off, the whole of the insertion side of the disk cartridge 1 may be shaped like substantially a circular arc along the stored disk. With this arrangement, the disk cartridge 1 can be miniaturized more.

There may be provided a configuration in which both of the pair of right and left loading recess portions are hidden by the shutter plate placed in the closed state.

Further, the present invention is not limited to the disk cartridge of the optical disk and can widely be applied to disk cartridges having an openable and closable shutter plate.

As set forth above, since the disk cartridge according to the present invention includes the disk housing and the pair of loading recess portions formed at the right and left side end portions in the insertion side of the disk cartridge and any one of the loading recess portions is hidden by the shutter which had been placed in the closed state, when the shutter is not opened, the loading recess portions cannot be chucked by the loading arm and hence the mis-loading or mis-insertion of the disk cartridge can be prevented.

Since the two corner portions on the insertion side of the disk cartridge are provided with the large diagonally cut recess surfaces, the disk cartridge can be miniaturized more. With this miniaturization of the disk cartridge, product devices such as video camera devices using the disk cartridge also can be miniaturized.

According to the disk cartridge loading method of the present invention, since the pair of the loading recess portions are held by the loading arm and the disk cartridge is brought to the loading position immediately after one loading recess portion that has been hidden is exposed as the shutter is being pressed and opened by the shutter lock releasing member of the drive apparatus when the disk cartridge is inserted into the drive apparatus, when the shutter is not opened even after the disk cartridge has been inserted into the drive apparatus, the loading recess portions cannot be held by the loading arm and the disk cartridge can be avoided from being brought to the loading position, thereby preventing the mis-loading or mis-insertion of the disk cartridge.

Having described preferred embodiments of the present invention with references to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. In a disk cartridge in which a disk housing for storing therein a disk serving as a recording medium such that said disk can freely rotate, said disk housing including a shutter for opening and closing a window portion through which said disk can be accessed from the outside, said disk cartridge characterized in that said disk housing includes a pair of loading recess portions for loading/unloading said disk cartridge formed at its left and right side end portions on the insertion side of said disk cartridge and any one of said loading recess portions is hidden by said shutter which has been placed in the closed state.

2. In a disk cartridge according to claim 1, said disk cartridge wherein said disk cartridge has diagonally cut large recessed surfaces formed at its respective corner portions in the insertion direction.

3. A disk cartridge loading method characterized in that a disk housing for storing therein a disk serving as a recording medium such that said disk can freely rotate includes a shutter for opening and closing a window portion through which said disk can be accessed from the outside, said disk housing includes a pair of loading recess portions for loading/unloading said disk cartridge formed at its left and right side end portions on the insertion side of said disk cartridge, one of said loading recess portions is hidden by said shutter that has been placed in the closed state, when said disk cartridge is inserted into a drive apparatus, said shutter is pressed and opened by a shutter lock releasing member of said drive apparatus, whereby immediately after said one loading recess portion that has been hidden by said shutter is exposed, said pair of loading recess portions are chucked by a loading arm and thereby said disk cartridge can be brought to the loading position.

\* \* \* \* \*